United States Patent [19]

Kuchuk-Yatsenko et al.

[11] Patent Number: 4,686,346
[45] Date of Patent: Aug. 11, 1987

[54] CONTROL DEVICE FOR FLASH-BUTT RESISTANCE WELDING MACHINE

[75] Inventors: Sergei I. Kuchuk-Yatsenko; Valery G. Krivenko; Alexei I. Gorishnyakov; Mikhail V. Bogorsky; Ivan L. Lazebny, all of Kiev, U.S.S.R.

[73] Assignee: Institute Elektrosvarki Imeni E.O. Patona Akademii Nauk Ukrainskoi SSR, Kiev, U.S.S.R.

[21] Appl. No.: 824,012
[22] PCT Filed: May 18, 1984
[86] PCT No.: PCT/SU84/00028
§ 371 Date: Dec. 30, 1985
§ 102(e) Date: Dec. 30, 1985
[87] PCT Pub. No.: WO85/05305
PCT Pub. Date: Dec. 5, 1985
[51] Int. Cl.⁴ ............................................. B23K 11/04
[52] U.S. Cl. ..................................... 219/110; 219/97; 219/101
[58] Field of Search ................. 219/97, 100, 101, 104, 219/110

[56] References Cited

U.S. PATENT DOCUMENTS 4,321,452  3/1982  Deffenbaugh ..................... 219/100
4,415,793  11/1983 Podola et al. ......................... 219/97

FOREIGN PATENT DOCUMENTS 2,713,329  10/1978 Fed. Rep. of Germany .
2457736  12/1980 France .
51-84750  7/1976  Japan ..................................... 219/97
643169    5/1984  Switzerland .

Primary Examiner—Clifford C. Shaw
Attorney, Agent, or Firm—Fleit, Jacobson, Cohn & Price

[57] ABSTRACT

There is proposed a control device for a flash-butt resistance welding machine, which comprises a welding transformer (1) whose primary winding is in series with a welding current pickup (7) connected to an electrohydraulic drive (30) of the moving electrode of the machine via a drive control unit (12). Said drive control unit (12) comprises two input amplifiers (14) and (15), first inputs thereof being coupled with the output of the welding current pickup (7), while second inputs of the amplifier (14) and (15) are coupled to a control voltage source (13). The output of each input amplifier (14) and (15) is connected, via transistor (21) or (22) and a voltage divider, to the input of an operational amplifier (29) whose output is connected to the input of the electrohydraulic drive (30), a welding voltage stabilizing unit being inserted into the primary circuit of the welding transformer (1), the control input of said stabilizing unit (6) being connected to the secondary winding of the welding transformer (1).

8 Claims, 3 Drawing Figures

CONTROL DEVICE FOR FLASH-BUTT RESISTANCE WELDING MACHINE

TECHNICAL FIELD

The present invention relates to welding and is more particularly concerned with a control device for a flash-butt resistance welding machine.

BACKGROUND ART

The currently urgent problem of finding more efficient welding techniques can be solved by cutting down the welding time by intensifying heating within a shorter welding period. The larger the section of welded pieces the more metal is saved.

Known in the art is a device for controlling the travel speed of welded pieces during flash-butt resistance welding (cf., for example, U.S. Pat. No. 3,335,257 Cl. 219-101, 1967) which comprises a hydraulic cylinder providing for a relative movement of welded pieces, a hydraulic follow-up control valve which controls the hydraulic cylinder and comprises a casing and a spring-loaded valve shaft, a reduction gear connected with the hydraulic valve shaft, a d.c. motor controlling the speed of convergence of welded pieces, and an electrical unit controlling the motor speed of rotation. The control unit comprises a cross-field rotary amplifier whose control winding is connected to a control voltage source (which controls the convergence speed of welded pieces). The control winding of the cross-field rotary amplifier is also connected to a welding current pickup. If the welding current exceeds a preset reference current level, current flowing through the control winding is the algebraic sum of the preset signal and that part of the feedback signal which exceeds the reference level.

The device is deficient in that it comprises a hydraulic control valve which is mechanically controlled and a reduction gear inevitably having gear clearances, making the response time of the device insufficiently long. The reverse movement command is executed only in 0.7-1 second in butt resistance welding machines equipped with such devices. The welding process cannot, therefore, be promptly controlled which is a serious drawback when dealing with welding of compact large-section pieces or thick-walled components.

Also known in the art is a device for controlling a flash-butt resistance welding machine (cf., for example, U.S. Pat. No. 3,555,237 Cl. B23K 11/04, 1971), comprising a welding transformer whose primary winding contains a workpiece voltage pickup connected, via a drive control unit, to an electrohydraulic drive actuating the moving machine.

The control unit feeds commands to an electrical coil of an electrohydraulic valve of the drive so that each half-period of the supply mains the direction and magnitude of current in the electrical coil are changed. The direction and volume of the hydraulic fluid passing through the electrohydraulic valve of the drive is, consequently, also changed and the head of the machine is correspondingly set into pulsating motion.

The control unit comprises a high-speed switching circuit connected to said electrical coil. The magnitude and direction of current in the electrical coil is the function of the voltage level of workpieces. The higher the voltage, the larger the "forward" period of the head movement within each half-period and the less the voltage the less the "forward" movement of the head and the more the "reverse" movement.

The high-speed switching circuit of the control unit comprises two transistors, the electrical coil being inserted between the collectors of said transistors in series with two potentiometers connected in parallel with two diodes. The base of one transistor is connected, via a resistor, to a collector of another transistor. In consequence, if the second transistor is non-conductive, the first transistor is necessarily rendered conductive and current from the power source passes through the electrical coil and the transistor to shift the shutter of the electrohydraulic valve so that the machine moves forward. Current passing through the coil can be adjusted by one of the potentiometers, the second potentiometer being shunted by a diode. The speed of movement can thus be regulated by changing the current.

The base of the second transistor is connected to an output of a Schmitt trigger circuit whose input receives the feedback voltage proportional to the welding voltage supplied from the welding transformer.

If the feedback voltage exceeds the operating threshold of the Schmitt trigger circuit, said circuit changes its state and the second transistor of the control circuit becomes conductive, the first transistor being rendered non-conductive. In consequence, the current in the coil is reversed and the machine movable plate starts moving "back". The speed of movement can be regulated by the potentiometer unshunted by the diode.

This device is capable of maintaining a stable flashing process since it responds to changes of the welding voltage in each half-period.

But it is deficient in that repeatability of heating of workpieces is difficult to achieve as the welding voltage varies within a very wide range. In addition, unavoidable variations of the mains voltage and the machine impedance in the process of operation of this control device bring about changes in the process. The permanent preset speed of movement of workpieces, brought either together or apart, results, considering above perturbations, in alterations of the flashing intensity and, consequently, in unstable heating affecting the quality of the welded joint.

SUMMARY OF THE INVENTION

The invention is to provide a control device for a flash-butt resistance welding machine, ensuring an improved quality of welded joints due to stabilization of heating of workpieces.

This object is achieved in that in a control device for a flash-butt resistance welding machine, comprising a welding transformer whose primary winding is in series with a welding process electric parameter pickup connected to an electrohydraulic drive of a machine movable plate via a drive control unit, according to the invention, said control unit comprises two input amplifiers, some inputs thereof being connected to an output of the welding process electrical parameter pickup which is a welding current pickup, while second inputs of said input amplifiers are connected to a control voltage source, the output of each input amplifier is connected, via a transistor and a voltage divider, to an input of an operational amplifier whose output is connected to an input of the electrohydraulic drive of the machine movable plate, the primary winding of the welding transformer comprising a welding voltage stabilizing unit whose control input is connected to the secondary winding of the welding transformer.

The quality of the welded joint can be improved and the efficiency of welding operations can be maintained on a high level due to stabilization of the intensive heating of workpieces achieved through the above design of the control unit and utilization of a welding voltage stabilization unit combined with a control voltage source.

BRIEF DESCRIPTION OF DRAWINGS

The invention will now be described in more detail with reference to a specific embodiment thereof, taken in conjunction with the accompanying drawings wherein.

BEST MODE FOR CARRYING OUT THE INVENTION

Figure 1:
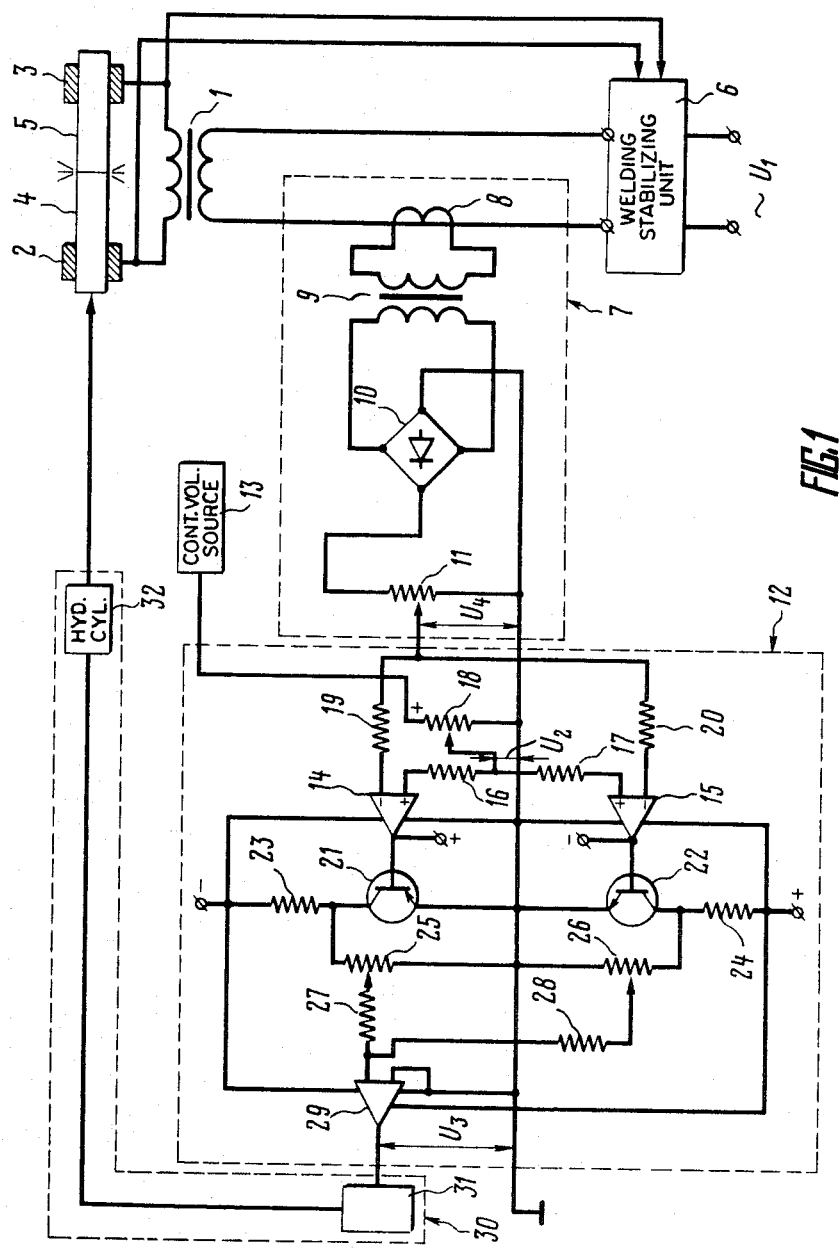
FIG. 1 shows a schematic circuit diagram of a control device for a flash-butt resistance welding machine, according to the invention.

A control device for a flash-butt resistance welding machine, according to the invention, comprises a welding transformer 1 (FIG. 1) whose secondary winding is connected to clamping dies 2 and 3, the clamping die 2 being on the moving head of the machine while the clamping die 3 is on the stationary electrode plate. Workpieces 4 and 5 are clamped in said dies 2 and 3. The primary winding of the welding transformer 1 is connected to the supply mains via a welding stabilizing unit 6 whose control input is connected to a secondary winding of the welding transformer 1. The circuit of the primary winding of the welding transformer 1 comprises a welding current pickup 7 which has a current transformer 8 connected to the primary winding of a step-up transformer 9. The secondary winding of the step-up transformer 9 is connected to a rectification bridge 10 whose output is coupled to a potentiometer 11. The output of the welding current pickup 7 is connected to one input of a drive control unit 12 whose second input is connected to a control voltage source 13.

The drive control unit 12 is built around two input amplifiers 14 and 15, some inputs thereof being connected, via input resistors 16 and 17, to a potentiometer 18 connected to the control voltage source 13, while second inputs thereof are connected, via resistors 19 and 20, to the potentiometer 11 of the welding current pickup 7. Outputs of the input amplifiers 14 and 15 are connected to bases of transistors 21 and 22 whose collectors are coupled to load resistors 23 and 24 and to potentiometers 25 and 26.

The load resistor 23 and potentiometer 25, on the one hand, and the load resistor 24 and potentiometer 26, on the other hand, form two voltage dividers.

Contact arms of the potentiometers 25 and 26 are connected, via input resistors 27 and 28, to the input of an operational amplifier 29. The output of the drive control unit 12 is coupled with an electrical drive 30 comprising an electrohydraulic valve 31 connected to an output of the drive control unit 12 and a hydraulic cylinder 32 controlled by said valve 31 for setting in motion of workpieces 4 and 5.

Figure 2:
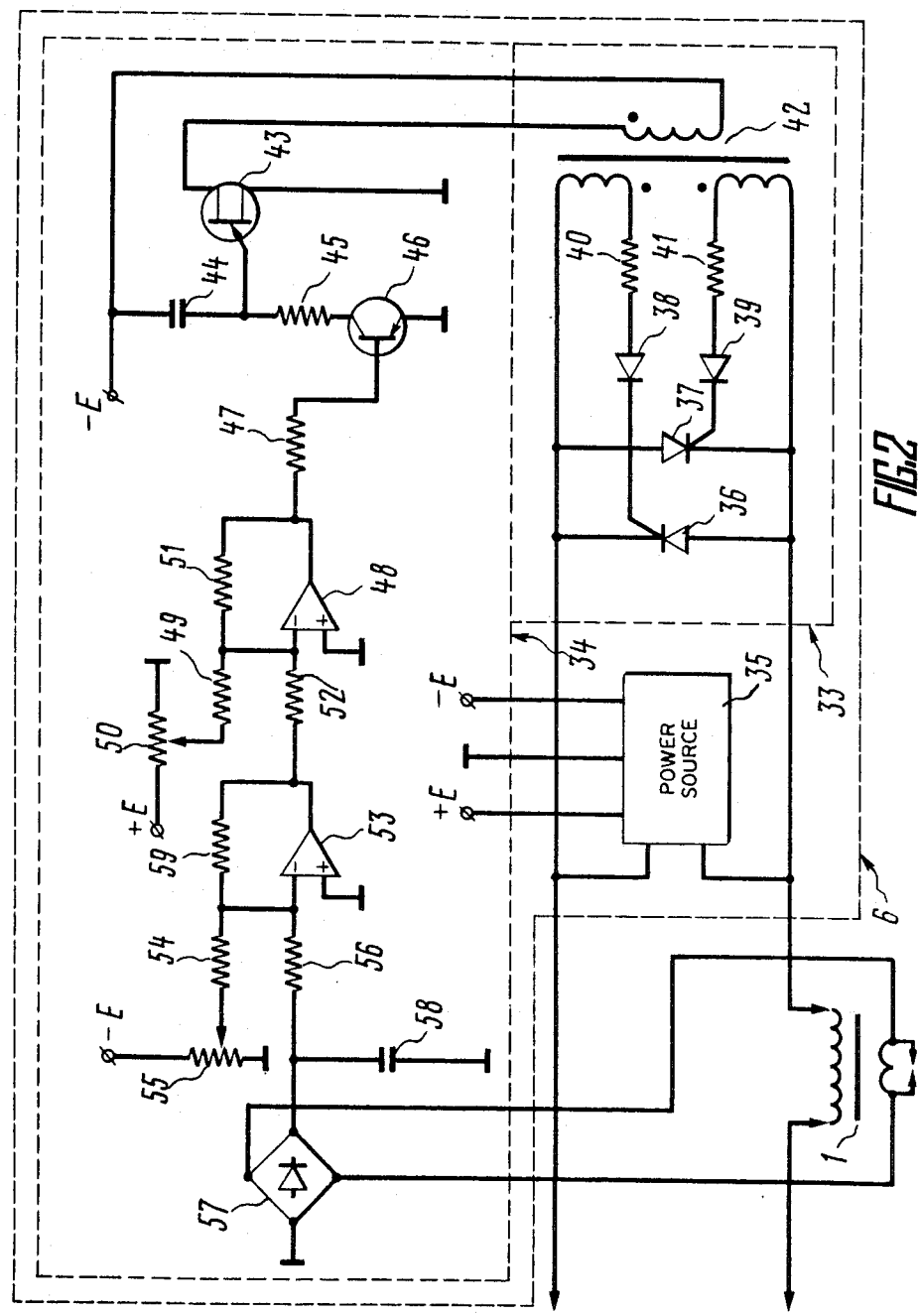
FIG. 2 shows a schematic circuit diagram of a voltage stabilizer, according to the invention.

The schematic circuit diagram of the welding voltage stabilizing unit 6 (FIG. 2) will be described in more detail hereinbelow.

The welding voltage stabilizing unit 6 comprises a thyristor contactor 33, a control unit 34 for said thyristor contactor 33 and a power source 35 for said control unit 34. The thyristor contactor 33 consists of two opposing power thyristors 36 and 37 whose control electrodes are connected, via diodes 38 and 39 and resistors 40 and 41, to the secondary windings of a transformer 42.

The primary winding of the transformer 42 has one lead thereof connected to the base of unijunction transistor 43 of the control unit 34 and the other lead connected to a capacitor 44. The emitter of the transistor 43 and the second terminal of the capacitor 44 of the control unit 34 are joined together and, via a resistor 45, to the collector of a transsistor 46. The base of the transistor 46 is connected, via a resistor 47, to the output of an amplifier 48. Positive voltage from a potentiometer 50 is supplied, via a resistor 49, to one of the inputs of the amplifier 48. The magnitude of said voltage controls the initial angle of current flow of the thyristors 36 and 37 of the thyristor contactor 33. A resistor 51 is inserted between the input and output of the amplifier 48 and controls the gain factor of the amplifier 48. The second input of the amplifier 48 is connected, via a resistor 52, to an output of an amplifier 53. One input of the amplifier 53 is coupled, via a resistor 54, to the contact arm of a potentiometer 55.

Negative voltage from the contact arm of the potentiometer 55 is supplied to the input of the amplifier 53 and it controls the welding voltage. The second input of the amplifier 53 is connected, via a resistor 56, to an output of a rectification bridge 57. A smoothing capacitor 58 is joined to the output of the rectification bridge 57. The input of the rectification bridge 57 is connected to the leads of the secondary winding of the welding transformer 1. The gain factor of the amplifier 53 is controlled by a resistor 59 inserted between the input and output of the amplifier 53. The smoothed positive voltage proportional to the welding voltage is taken from the rectification bridge 57 and delivered to the input of the amplifier 53 via the resistor 56. This voltage is algebraically added, at the input of the amplifier 53, to the voltage fed from the potentiometer 55 and the voltage difference, between a preset voltage and the actual welding voltage, appears at the output of the amplifier 53.

The sign of the output voltage of the amplifier 53 is selected so that, when the welding voltage exceeds a preset value, the output voltage of the amplifier 53 is subtracted from the voltage fed from the potentiometer 50 decreasing the output voltage of the amplifier 48 and, consequently, decreasing the base current of the transistor 46. This diminishes the collector current of the transistor 46 which is the charging current of the capacitor 44. In consequence, the unijunction transistor 43 becomes conductive with a delay and a short current pulse passes through the primary winding of the transformer 42, which is initiated by the discharge of the capacitor 44. Control pulses having a specific phase in relation to the zero value of the a.c. sinusoid are then supplied from the secondary windings of the transformer 42 to the control electrodes of the thyristors 36 and 37. The phase, or the electric angle, of control pulses is, therefore, dependent upon the magnitude of the voltage taken from across the potentiometer 50 and the output voltage of the amplifier 53. The larger the phase of control pulses the larger the angle of current flow of the thyristors 36 and 37 and, consequently, the lower the welding voltage. When the welding voltage goes below a specified level, the above described process is reversed; the phase of control pulses becomes less, as does the angle of current flow of the thyristors 36 and 37, and the welding voltage rises to the preset value.

A control device for a flash-butt resistance welding machine operates as follows.

Figure 3:
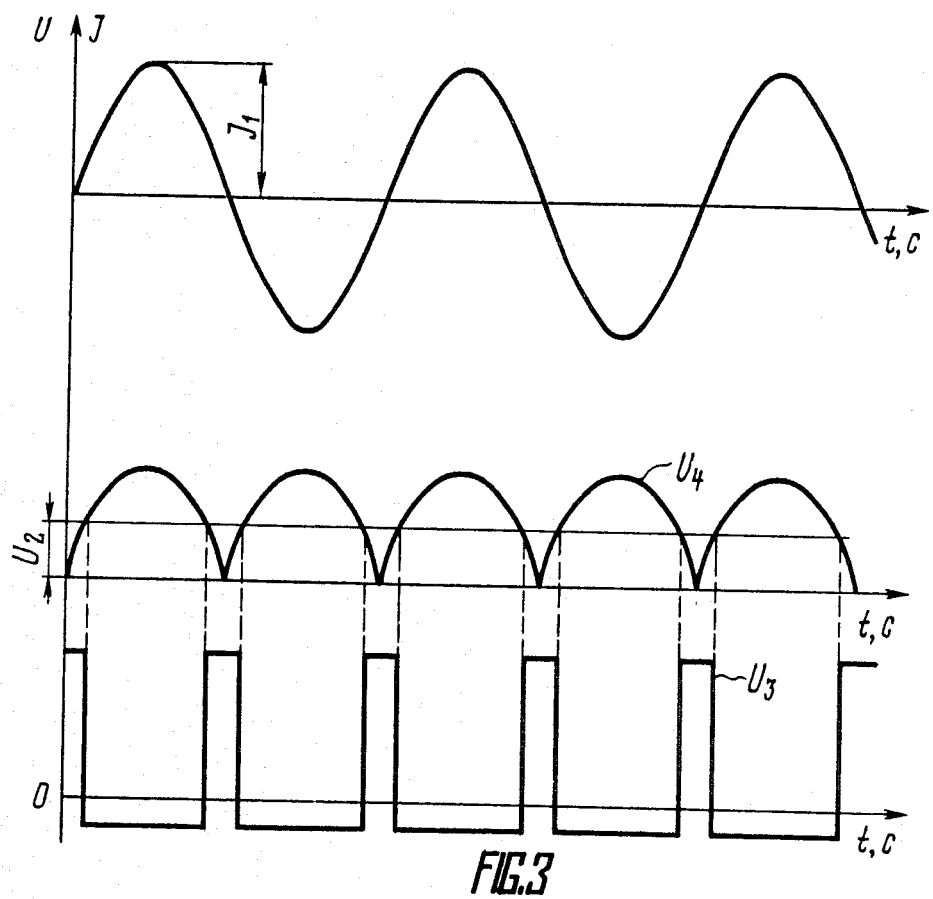
FIG. 3 shows charts explanatory of the operation of a control device for a flash-butt resistance welding machine, according to the invention.

The voltage $U_1$ (FIGS. 1 and 3) of the supply mains is applied across the primary winding of the welding transformer 1 (FIGS. 1 and 2) via the thyristor contactor 33 (FIGS. 2) of the welding voltage stabilizing unit 6. Further on said voltage is taken from the secondary winding of the welding transformer 1 (FIG. 1) via the clamping dies 2 and 3 to be applied to workpieces 4 and 5. When supply voltage is fed to the drive control unit 12 and the control voltage source 13, the positive voltage $U_2$ is obtained from the potentiometer 18 (FIGS. 1 and 3), which is applied, via the resistors 16 and 17 (FIG. 1), to the noninverting inputs of the input amplifiers 14 and 15 of the drive control unit 12. No voltage is available at the inverting inputs of the input amplifiers 14 and 15 since welding has not started yet and no welding current $J_1$ (FIG. 3) is available. In consequence, positive voltate is available at the outputs of the input amplifiers 14 and 15 (FIG. 1), which makes the transistor 22 (n-p-n type) conductive to shunt the potentiometer 26, which is equivalent to "grounding" of the input resistor 28. Simultaneously, the transistor 21 (p-n-p type) is nonconductive and the negative voltage of the supply source is applied via the resistor 23 to the potentiometer 25. The negative voltage whose magnitude depends on the position of the arm of the potentiometer 25 is applied, via the resistor 27, to the input of the operational amplifier 29 whose output voltage $U_3$ (FIGS. 1 and 3) is supplied to the input of the electrohydraulic valve 31 of the drive 30.

The electrohydraulic valve 31 controls the hydraulic cylinder 32 so that the workpieces 4 and 5 start moving towards each other. When they touch, the welding current appears in the primary winding of the welding transformer 1, which is converted by the transformer 8 into a voltage to be amplified by the step-up transformer 9 of the welding current pickup 7. A voltage proportional to the welding current $I_1$ (FIG. 3) is supplied from the secondary winding of the step-up transformer 9 (FIG. 1) to the rectification bridge 10 and the rectified voltage from the output of said rectification bridge 10 is applied across the potentiometer 11. The magnitude of the voltage $U_4$ (FIGS. 1 and 3) is determined by the position of the arm of the potentiometer 11 (FIG. 1) wherefrom it is supplied to the inverting inputs of the amplifiers 14 and 15. Until the welding current $I_1$ (FIG. 3) exceeds a preset level corresponding to the control voltage $U_2$, the workpieces 4 and 5 (FIG. 1) draw together at a specific speed. But as soon the preset level is exceeded by the welding current $I_1$ (FIG. 3), the voltage $U_4$ becomes more than the voltage $U_2$ and the voltage sign at the outputs of the input amplifiers 14 and 15 (FIG. 1) changes from plus to minus. The transistor 21 becomes conductive and shunts the potentiometer 25 thus stopping the convergence of the workpieces 4 and 5. The transistor 22 is at the same instant made nonconductive and the positive voltage from the arm of the potentiometer 26 is applied via the resistor 28 to the input of the operational amplifier 29. This voltage determines the speed of disengagement of the workpieces 4 and 5. From the output of the amplifier 29 the voltage is supplied to the input of the electrohydraulic valve 31 which regulates the feed of the working fluid to the hydraulic cylinder 32.

The workpieces draw apart until the voltage $U_4$ (FIGS. 1 and 3) goes below the preset voltage $U_2$. As soon as the voltage $U_4$ becomes less than the $U_2$, the input amplifiers 14 and 15 (FIG. 1) jump to the initial state and the workpieces start drawing together again, the process is repeated.

The voltage across the workpieces 4 and 5 can vary in the welding process either due to variations of the welding current or due to possible variations of the supply power, or due to the altering impedance of the machine. Taken together these factors can seriously affect the stability of heating of the workpieces 4 and 5 and the quality of the welded joints. In order to eliminate such effects the opening angle of the thyristor contactor 33 of the welding voltage stabilizing unit 6 can be adjusted conformably to the existing voltage across the workpieces 4 and 5 and to maintain a stable voltage across the workpieces 4 and 5 in the process of welding.

INDUSTRIAL APPLICABILITY

This invention can be used for butt resistance welding by means of machines using high-speed electrohydraulic servo drives. Primarily, such machines are intended for workpieces having large but compact sections like rails, rolled stock, locomotive engine cases and rings.

We claim:

1. In a control device for a flash-butt resistance welding machine including a welding transformer having a primary winding and a secondary winding, a machine movable plate, an electrohydraulic drive for the machine movable plate, a drive control unit, and a welding process electric parameter pickup means in series with the primary winding of said welding transformer and electrically connected to the electrohydraulic drive of the machine movable plate via the drive control unit, the improvement comprising the drive control unit including two amplifiers each having first and second inputs and an output, the first inputs of said two amplifiers being connected to the welding process electrical parameter pickup means, a control voltage source, the second inputs of said two amplifiers being connected to the control voltage source, an operational amplifier having two inputs and an output with its output connected to the electrohydraulic drive, a transistor and voltage divider means connecting the outputs of said two amplifiers to an input of the operational amplifier, and a welding voltage stabilizing means for interconnecting the primary winding of the welding transformer to a power supply, said welding voltage stabilizing means having a control input means connected to the secondary winding of the welding transformer.

2. In a control device according to claim 1 wherein the second inputs to said two amplifiers are connected to the control voltage source through voltage divider means.

3. In a control device according to claim 1 wherein the welding process electric parameter pickup means includes rectifier means and voltage divider means.

4. In a control device according to claim 1 wherein the transistor and voltage divider means includes a pair of transistors and a pair of voltage dividers.

5. In a control device according to claim 4 wherein one transistor is of the n-p-n type and the other transistor is of the p-n-p type.

6. In a control device according to claim 1 wherein the control input means includes comparison means for comparing actual welding voltage with a preset voltage to obtain the difference therebetween and thyrister means having control electrodes to apply control pulses to the welding voltage, said difference being applied to the control electrodes the control said control pulses.

7. In a control device according to claim 6 wherein the thyrister means includes two opposing thyristers.

8. In a control device according to claim 7 wherein the difference is applied via a transformer and diodes.

* * * * *